United States Patent [19]
Pfeiffer

[11] Patent Number: 6,163,553
[45] Date of Patent: Dec. 19, 2000

[54] LASER FOR GENERATING AN OPTICAL COMB

[75] Inventor: Thomas Pfeiffer, Stuttgart, Germany

[73] Assignee: Alcatel, Paris, France

[21] Appl. No.: 09/110,719

[22] Filed: Jul. 7, 1998

[30] Foreign Application Priority Data

Jul. 18, 1997 [DE] Germany .......................... 197 30 830

[51] Int. Cl.$^7$ ............................. H01S 3/30; G02B 6/34; G02B 6/00
[52] U.S. Cl. .................................. 372/6; 385/37; 385/140
[58] Field of Search ................................ 372/6; 385/140, 385/37

[56] References Cited

U.S. PATENT DOCUMENTS

| | | | |
|---|---|---|---|
| 5,546,414 | 8/1996 | Pfeiffer | 372/18 |
| 5,581,389 | 12/1996 | Lee | 359/156 |
| 5,699,468 | 12/1997 | Farries et al. | 385/140 |
| 5,875,237 | 2/1999 | Mizrahi et al. | 385/37 |
| 5,959,766 | 9/1999 | Otterbach et al. | 359/337 |

FOREIGN PATENT DOCUMENTS

| | | |
|---|---|---|
| 0486930 | 5/1992 | European Pat. Off. . |
| 0575750 | 12/1993 | European Pat. Off. . |
| 2290904 | 1/1996 | United Kingdom . |

OTHER PUBLICATIONS

"24–Line Multiwavelength Operation of Erbium–Doped Fiber–Ring Laser", N. Park et al, *IEEE Photonics Technology Letters*, vol. 8, No. 11, Nov. 1996, pp. 1459–1461.

"High–Power Er–Yb–Doped Fiber Amplifier with Multichannel Gain Flatness within 0.2 dB over 14 nn", N. park et al, *IEEE Photonics Technology Letters*, vol. 8, No. 9, Sep. 1996, pp. 1148–1150.

"Multiwavelength Generation in an Erbium–Doped Fiber Laer Using In–Fiber Comb Filters", J. Chow et al, *IEEE Photonics Technology Letters*, vol. 8, No. 1, Jan. 1996, pp. 60–62.

"Multiwavelength Generation in an Erbium–Doped Fiber Laser Using In–Fiber comb Filters", J. Chow et al, *IEEE Photonics Technology Letters*, vol. 8, No. 1, Jan. 1996 (New York), pp. 60–62.

"Fibre–Pigtailed Fabry–Perot Filter Used as Tuning Element and for Comb Generation in an Erbium Doped Fibre Ring Laser", H. Schmuck et al, *IOOC–ECOC '91*, 17th European Conference on Optical Communication ECOC '91. 8th Int'l Conference on Integrated Sep. 9–12 1991, vol. 1, pp. 145–148.

"Digitally Tunable Wavelength Filter and Laser", M. Parker et al, *IEEE Photonics Technology Letters*, vol. 8, No. 8, Aug. 1996, pp. 1007–1008.

Derwent WPI English abstract of Ando Electric DE 44 46 969 (pub. Jun. 1995) & corresponding USP 5,581,389.

Derwent WPI English abstract of Haltenorth+/Siemens DE 196 36 230 (pub. Apr. 3, 1997).

Derwent WPI English abstract of Schmuck+/Alcatel DE 196 53 821 (pub. Jun. 25, 1998).

Chow et al (IEEE Photonics Technology Letters, vol. 8, No. 1, Jan. 1996, Multiwavelength Generation in an Erbium–Doped Fiber Laser Using In–Fiber Comb Filters).

*Primary Examiner*—Frank G. Font
*Assistant Examiner*—Armando Rodriguez
*Attorney, Agent, or Firm*—Milton Oliver; Ware, Fressola, Van Der Sluys & Adolphson LLP

[57] ABSTRACT

A laser for generating an optical comb is disclosed having an active laser medium enclosed in a resonator, a launching coupler for coupling pump light from a pump source into the active medium, an output coupler for coupling out the generated laser comb, and at least one optical filter within the resonator for generating the comb. A filter for introducing a wavelength-dependent loss within the gain profile of the active medium is inserted in the resonator. As a result, the ring gain becomes unity over a wide range, and many modes of the comb start oscillating in the resonator.

11 Claims, 2 Drawing Sheets

LASER FOR GENERATING AN OPTICAL COMB

BACKGROUND OF THE INVENTION

1. Technical Field

This invention relates to a laser for generating an optical comb.

2. Discussion of Related Art

Lasers which serve to generate an optical comb for use in, e.g., optical wavelength-division multiplex systems are known in the art. For instance, an article by N. Park et al, "24-Line Multiwavelength Operation of Erbium-Doped Fiber-Ring Laser", IEEE Photonics Technology Letters, Vol. 8, No. 11, November 1966, describes an erbium-doped fiber-ring laser in which the individual wavelengths are selected via a Lyot filter incorporated in the ring resonator. At low temperatures it is then possible to obtain an optical comb in the range of 1535 to 1560 nm. At room temperature, only few wavelength peaks are obtainable since at such a temperature and with a conventional resonator design, the criterion "ring gain equal to unity" cannot be met for many wavelengths, because the gain is wavelength-dependent. Under the circumstances, simultaneous oscillation of just a few lines is only possible in a narrow wavelength range. Cooling the fiber to liquid nitrogen temperature, e.g., for use in a commercial transmitter, is impractical and very expensive.

SUMMARY OF THE INVENTION

It is therefore an object of the invention to construct an optical comb generator which is capable of generating a wide gain spectrum at room temperature, thus permitting multiwavelength oscillation of the resonator.

According to the present invention, a laser for generating an optical comb, comprising an active laser medium enclosed in a resonator, means for coupling pump light from a pump source into the active laser medium, means for coupling out the generated optical comb, and at least one optical filter within the resonator for generating the optical comb, is characterized in that at least one filter is inserted in the resonator for introducing a wavelength-dependent loss within the gain profile of the active laser medium.

The laser according to the invention, with the above-described features, has the advantage that a filter additionally incorporated into the resonator introduces a wavelength-dependent loss in the resonator, whereby losses are caused which are inverse to the gain spectrum of the laser. This means that at a wavelength at which the gain of the laser must be particularly high, the losses must also be particularly high.

It is particularly advantageous to use the filter in a laser whose resonator is constructed linearly. Another preferred embodiment uses a laser with a ring resonator.

Particularly advantageous is the use of a Fabry-Perot filter which brings the ring gain to unity over a wide range, thus causing oscillation of many laser modes. A Fabry-Perot filter can be easily incorporated into any form of resonator.

The loss filter is advantageously designed as a wavelength-dependent coupler. Via the coupler, light of the wavelength with the greatest gain is coupled out more than light with less gain. Thus, the ring gain is a function of the wavelength and can be brought to unity over a wide wavelength range.

A further preferred embodiment uses a dielectric filter with wavelength-dependent mirror coatings. Such a filter is used to advantage as an output mirror in a linear resonator.

The filters, or at least one of them, are implemented using integrated optical technology, i.e., they are constructed on a silicon substrate, for example.

The use of the loss filter is particularly effective in a laser whose active material is a rare-earth-doped fiber. At room temperature in a suitable resonator, such active material has a broad gain profile, and can thus be used with great advantage to generate the optical comb. It is also advantageous to implement a laser whose active material is a rare-earth-doped solid.

BRIEF DESCRIPTION OF THE DRAWINGS

Embodiments of the invention are illustrated in the accompanying drawings and will be explained in more detail in the following description.

DETAILED DESCRIPTION OF PREFERRED EMBODIMENTS

Figure 1:
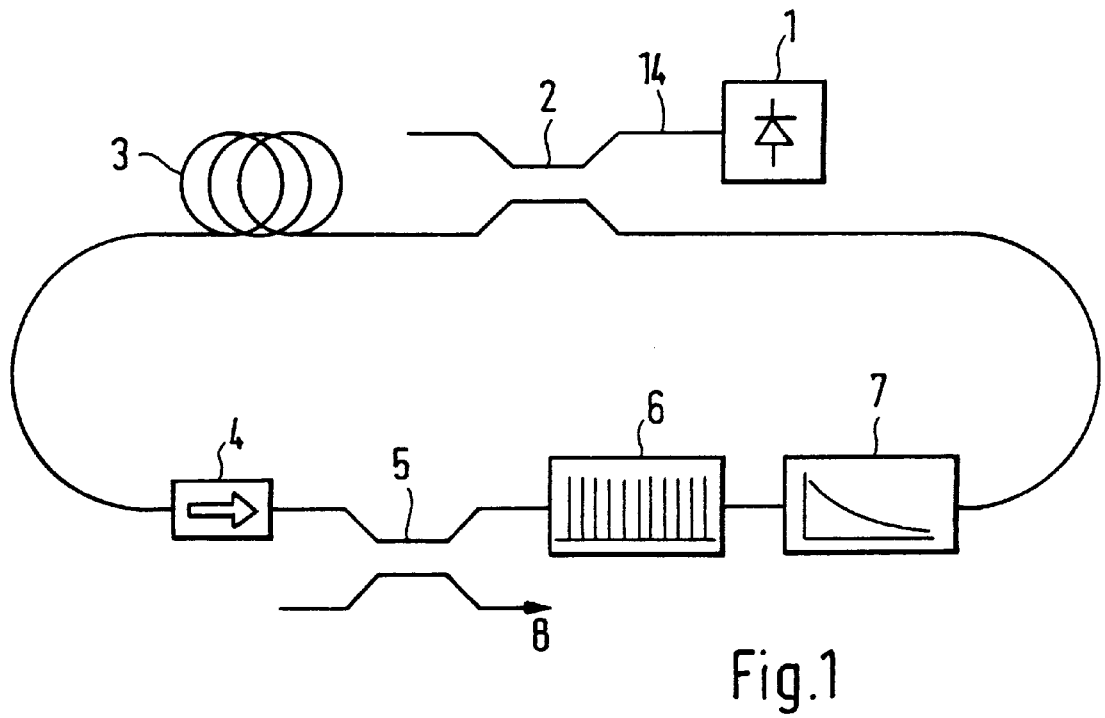
FIG. 1 shows a ring laser.

FIG. 1 shows the construction of a ring laser which consists of an active fiber 3 within a fiber ring. The active fiber 3 is connected to a pump source 1 via a launching coupler 2. The fiber ring contains an optical isolator 4, an output coupler 5, a periodic filter 6, and a loss filter 7. The light from the pump source 1 is fed into a fiber 14. It is coupled into the fiber ring and the active fiber 3 using the wavelength-selective coupler 2. The pump light, having a wavelength of, e.g., 980 nm, pumps erbium ions with which the active fiber 3 is doped. The generated laser light is fed back through the ring resonator, and the laser starts oscillating in individual ring-resonator modes. The periodic filter 6, implemented with a Fabry-Perot filter, for example, forces the laser to oscillate in modes corresponding to the transmission maxima of the filter. To enable the ring laser to also start oscillating in many modes which are permitted by the periodic filter, the gain profile of the laser must be changed with lossy components such that the ring gain is unity. Via the output coupler 5, the optical comb 8 is extracted from the resonator. The output coupler 5 may operate selectively, i.e., the pump wavelength which is still within the ring resonator, is not coupled out.

Figure 2:
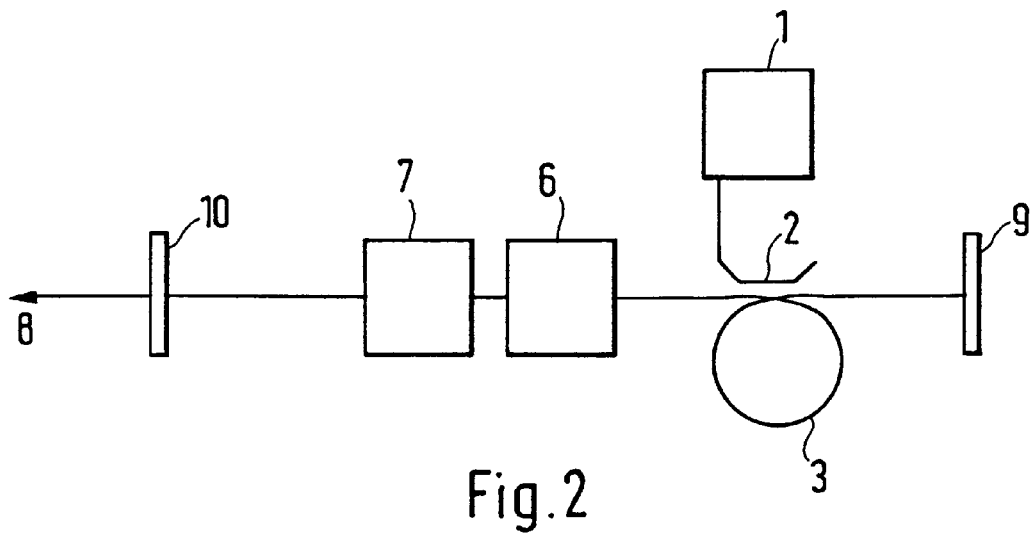
FIG. 2 a linear laser.

FIG. 2 shows an embodiment with a linear resonator comprising a highly reflecting mirror 9 and an output mirror 10. The active laser medium 3 is within the resonator, just as the periodic filter 6 and the loss filter 7. The light from the pump source 1 is coupled into the resonator using a wavelength-selective coupler 2.

Figure 3:
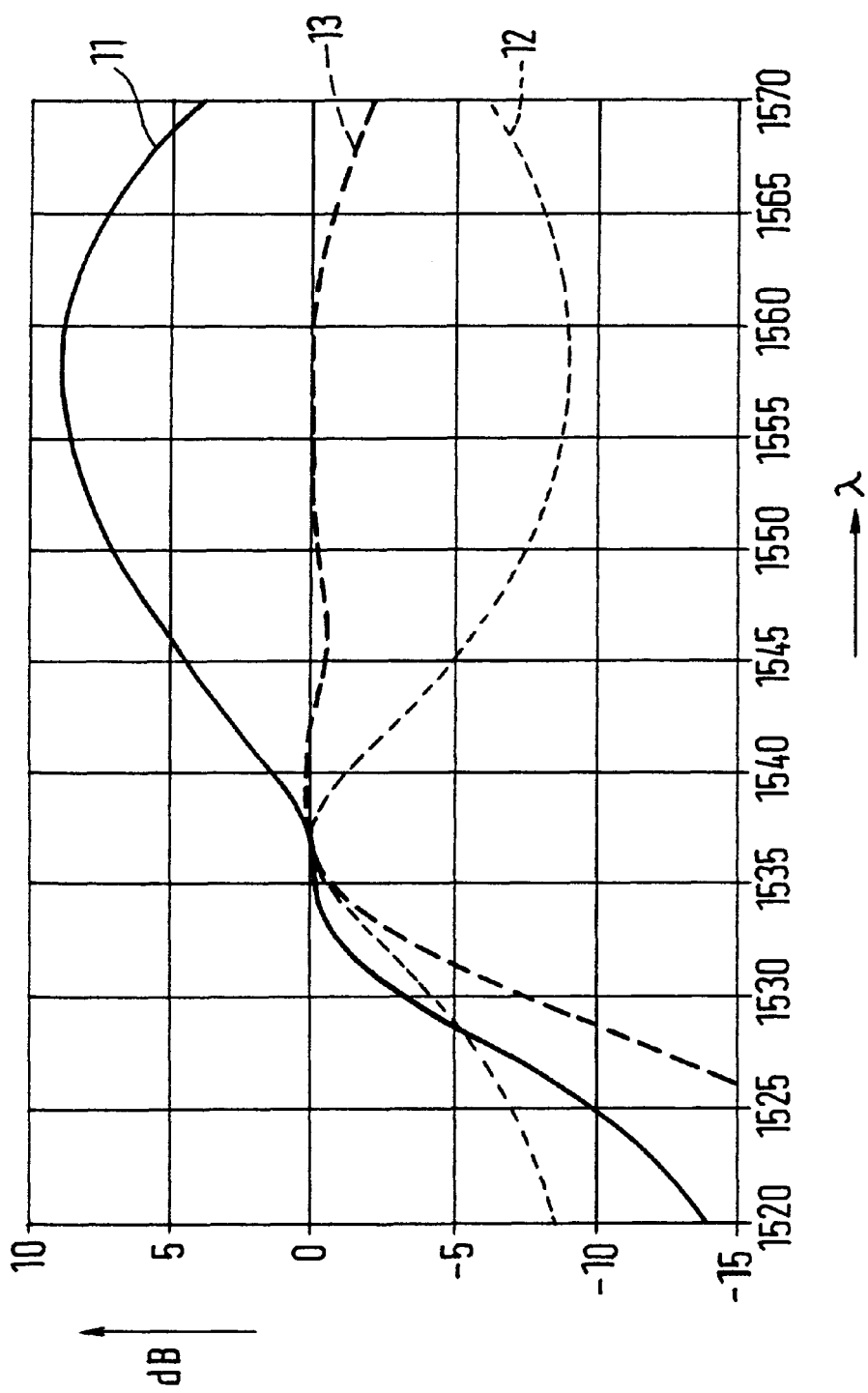
FIG. 3 gain curves.

In FIG. 3 the gain of a ring-laser resonator is plotted against the wavelength $\lambda$. The solid curve 11 marks the necessary losses for a unity ring gain, which was calculated by subtracting the internal losses from the gain of the erbium fiber. The loss curve 11 is dependent on the operating point of the doped fiber, i.e., essentially on the optical input powers at the pump and oscillation wavelengths. The dotted line 12 marks an exemplary transmission curve of a Fabry-Perot filter adapted to act as a compensating filter. Curve 13 shows the result of a loss insertion by the compensating filter with the transmission characteristic 12. The ring gain becomes nearly unity over the range of 1537 to 1560 nm. In this range, many individual wavelengths of the optical comb can start oscillating.

A Fabry-Perot filter which is incorporated as a loss filter into a resonator should have a wide, flat transmission spectrum as can be achieved by reducing the quality factor by reduction of the reflectivity of the reflecting surfaces. The use of a Mach-Zehnder filter designed as a bandpass filter is also conceivable.

A loss filter can be implemented with an output coupler which couples out the energy in the resonator as a function of the wavelength. It is necessary to couple out the wavelengths at the slopes of the gain profile less than the wavelength at the peak of the gain profile. Such a wavelength-dependent output coupler can be implemented as a fiber coupler but may also be designed as an output mirror 10, preferably in a linear resonator arrangement. The output mirror 10 has a dielectric coating with a transmission characteristic which results in maximum coupling losses at the peak of the gain curve.

The incorporation of the loss filters is applicable to all lasers in which the homogeneous line width of the gain is substantially greater than the spacing of the individual oscillating wavelengths. This applies particularly to lasers whose active material is doped with rare-earth elements such as erbium, neodymium, etc. Both the use of doped fibers and the use of doped solids, such as glass rods etc., is conceivable.

All filters which are incorporated into the resonator can also be implemented in integrated optical technology, for example by constructing the filters on an optical substrate. Fabry-Perot filters, for example, can be burnt as Bragg gratings into an UV-sensitive surface by exposure with UV light.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A laser for generating an optical comb, comprising
an active laser medium (3) enclosed in a resonator,
means for coupling pump light from a pump source (1) into the active laser medium, thereby forming a laser having a wavelength-dependent gain profile (12),
means (5, 10) for coupling out a resulting optical comb (8) having a plurality of spectral lines at respective wavelengths, and
at least one optical filter (6) within the resonator for generating the optical comb,
further comprising
at least one filter (7) in the resonator which introduces a wavelength-dependent loss (11) which is inverse to and compensating for the gain profile (12) of the active laser medium, resulting in a net (13) of said laser gain and said filter loss which is substantially constant across a $\lambda$ range including said plurality of spectral lines in said optical comb.

2. A laser as claimed in claim 1, characterized in that the resonator is constructed linearly.

3. A laser as claimed in claim 1, characterized in that the resonator is constructed as a ring.

4. A laser as claimed in claim 1, characterized in that at least one of the optical filter (6) and the at least one filter (7) is designed as a Fabry-Perot filter.

5. A laser as claimed in claim 1, characterized in that said at least one filter (7) is designed as a wavelength-dependent coupler.

6. A laser as claimed in claim 1, characterized in that said at least one filter (7) is designed as a dielectric filter with wavelength-dependent mirror coatings.

7. A laser as claimed in claim 1, characterized in that the at least one of the optical filter (6) and the at least one filter (7) is implemented as an integrated optical device.

8. A laser as claimed in claim 1, characterized in that the active laser medium is a rare-earth-doped fiber.

9. A laser as claimed in claim 1, wherein the active laser medium is a rare-earth-doped solid.

10. A laser as claimed in claim 1, characterized in that the optical filter (6) and the at least one filter (7) are separated by optical isolators.

11. A laser according to claim 1, wherein said substantially constant range includes a wavelength range 1537 nm through 1560 nm.

* * * * *